(12) United States Patent
Simms

(10) Patent No.: US 7,062,112 B2
(45) Date of Patent: Jun. 13, 2006

(54) SMT LED INDICATOR PACKAGE

(75) Inventor: Norman Simms, Barnegat, NJ (US)

(73) Assignee: CML Innovative Technologies, Inc., Hackensack, NJ (US)

( * ) Notice: Subject to any disclaimer, the term of this patent is extended or adjusted under 35 U.S.C. 154(b) by 241 days.

(21) Appl. No.: 10/652,185

(22) Filed: Aug. 29, 2003

(65) Prior Publication Data

US 2004/0120632 A1 Jun. 24, 2004

Related U.S. Application Data

(60) Provisional application No. 60/407,434, filed on Aug. 29, 2002.

(51) Int. Cl.
*G02B 6/12* (2006.01)

(52) U.S. Cl. .......................... 385/14; 385/88; 385/146; 385/52

(58) Field of Classification Search ................. 385/14, 385/52, 88–94, 129–132, 146

See application file for complete search history.

(56) References Cited

U.S. PATENT DOCUMENTS

| | | | | |
|---|---|---|---|---|
| 5,136,682 A | * | 8/1992 | Moyer et al. | 385/141 |
| 6,088,498 A | * | 7/2000 | Hibbs-Brenner et al. | 385/52 |
| 6,512,861 B1 | * | 1/2003 | Chakravorty et al. | 385/14 |

* cited by examiner

*Primary Examiner*—Michelle Connelly-Cushwa
*Assistant Examiner*—Kevin S. Wood
(74) *Attorney, Agent, or Firm*—Ostrolenk, Faber, Gerb & Soffen, LLP

(57) ABSTRACT

A temperature resistant waveguide is mounted to an SMT LED package to provide a complete module that can withstand temperatures found in a solder reflow process without deformation or damage. The waveguide is composed of a high temperature thermoplastic and is coupled to the LED using automated equipment with optical markings for precise positioning and construction. The SMT LED module is automatically located on a printed circuit board and exposed to temperatures for a solder reflow process. The high temperature thermoplastic does not deform during the solder reflow process, thereby providing a robust SMT LED module that can be automatically manufactured and placed on a printed circuit board, without additional steps or human intervention.

6 Claims, 1 Drawing Sheet

SMT LED INDICATOR PACKAGE

RELATED APPLICATION

This application is based on and claims benefit of U.S. Provisional Application No. 60/407,434, filed Aug. 29, 2002, entitled SMT LED INDICATOR PACKAGE, the entire disclosure of which is hereby incorporated by reference, and to which a claim of priority is hereby made.

BACKGROUND OF THE INVENTION

1. Field of the Invention

The present application relates generally to packages for LEDs, and relates more particularly to an LED package that can be manufactured completely automatically.

2. Description of Related Art

Light emitting diodes (LEDs) are typically wired through a connection to a circuit board that can be prefabricated to accept a standard LED, or custom made to receive LED connections to permit connectivity to an operating circuit and other circuit components. One type of standard LED has elongated pins that are accepted through holes in a printed circuit board (PCB), and then soldered in place to provide a mechanical and electrical bond to the PCB. The PCB typically has a number of holes and traces for mounting other components to be interconnected to form a circuit. Often, PCBs are assembled with components using automated machinery known as pick and place type robotic machines that can grasp a component, position it in an appropriate place over a desired PCB, and insert the component into the PCB. This type of circuit board manufacture is also referred to as "stuffing". Once a printed circuit board has been assembled to a state in which the components can be soldered, the printed circuit board is often passed through a soldering device that operates at a typically high temperature with regard to component tolerances, to reflow solder that has been previously deposited on the PCB, in addition to obtaining a good mechanical and electrical bond between added solder and board components.

Another technique for manufacturing circuit boards with components involves surface mount technology (SMT), in which a component is mounted to a PCB surface, rather than into PCB holes. SMT components are often much smaller in size than equivalent thru-hole mounted devices, and therefore obtain the advantage of further reduction in PCB size. Similar to thru-hole mounted devices, SMT devices are often picked and placed by automatic equipment that is programmed to precisely position an SMT device over a selected portion of a PCB. The PCB is provided with solder pads that align with connections provided on the SMT device to be mounted, and the positioning equipment places the SMT device precisely over the solder pads during the manufacturing process. Once the SMT device is placed in contact with the solder pads, an infra-red (IR) convection or similar process heats the PCB and circuitry components to a reflow temperature of the solder paste, which is often a lead tin combination. Accordingly, the heat profile of the reflowed solder has an average peak temperature of approximately 220° C.

It is often the case that some SMT devices are susceptible to the temperatures involved in a reflow process, in that they can suffer degradation or damage if they are heated above a certain threshold temperature for a certain period of time. An SMT device that is sensitive to heat levels that may be required in the reflow process are often packaged with a protective heat transfer cover or other substrate, for example. In the case of SMT LED devices, an LED die is coupled to a printed circuit substrate having solder pads for attachment to a PCB. The LED die is attached to the upper surface of the printed circuit substrate with a protective transparent transfer molded cover. The protective cover is provided for the purpose of protecting the LED die against experiencing damaging temperatures during a solder reflow process. The protective cover does not provide any kind of lensing or optical properties for use with the LED.

LED light output is often used for signaling purposes, such as in the case of indicators, and it is therefore desirable to direct the LED light output in a particular direction or with particular characteristics to accomplish a design goal. If no lensing or optical control is provided, the LED light output is somewhat inefficient in accomplishing the purpose for which it is often intended.

During the manufacture of devices having SMT LEDs, a lensed or optically controlled light package is obtained by placing a separate, secondary, optical component over the LED package to modify the light output of the LED. Often, the secondary optical component is a waveguide or optical lens that directs light in an intended direction according to a particular application.

Although it would be desirable to provide a lens or optical component to the LED at the time of manufacture with the PCB, the desired materials for providing suitably precise lensing or optical control are unable to withstand the reflow soldering process. The lensing or optical component is therefore coupled to the LED after the reflow process when the PCB has cooled sufficiently. Typically, SMT components do not require any further processing after the reflow process, since the advantages of SMT processing lies in automated manufacture and smaller sizes without human intervention. Accordingly, it becomes very inefficient and defeats the purpose of surface mount technology if an additional step is required after the reflow process with human intervention. However, due to the nature of SMT LED devices, and the unavailability of material suitable for lensing or optical control that are desirable for use with SMT LEDs, an additional placement process must be provided after the reflow process to achieve a finished PCB. That is, the lensing or optical control component must be placed by hand, typically, on the SMT LED device after the reflow process is completed. For example, one conventional method consists of a lens coupled to an opaque box, which is then glued on top of a typical or standard SMT LED. The process is time consuming and costly, while diminishing the value obtained in the SMT processing.

SUMMARY OF THE INVENTION

In accordance with the present invention, there is provided a complete, lensed LED structure mountable on a substrate with high thermal robustness and able to withstand solder reflow temperatures. In an exemplary embodiment, a waveguide device is provided with an SMT LED device for directing light from the LED in a specified direction. The waveguide is mounted to a substrate on which the LED is provided, and positioned to obtain high efficiency for transmission of light emitted from the LED. The substrate on which the LED is provided has solder pads with locations and dimensions suitable for use as an SMT package, and usable with printed circuit board layouts for standard LED packages.

The material used for constructing the waveguide is, for example, an injection molded thermoplastic that retains its shape when exposed to typical temperatures found in a solder reflow process. The waveguide is molded with defined guides for use with automatic pick and place circuit board construction equipment. The waveguide is also provided with markings or structures to permit optical alignment between the waveguide and the substrate on which the LED is provided. The waveguide and the substrate are attached to each other by any suitable means that can be maintained during the solder reflow process.

BRIEF DESCRIPTION OF THE DRAWINGS

The present invention is described in greater detail below, with reference to the accompanying drawings, in which.

DETAILED DESCRIPTION OF THE PREFERRED EMBODIMENTS

Figure 3:
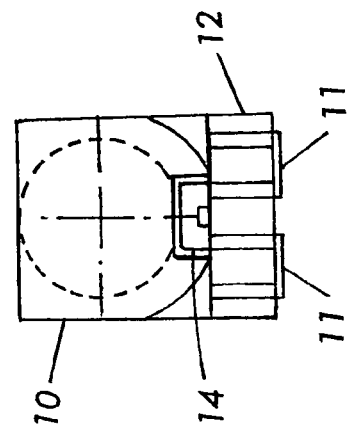
FIG. 3 is a side view of the device of FIG. 1.
Figure 2:
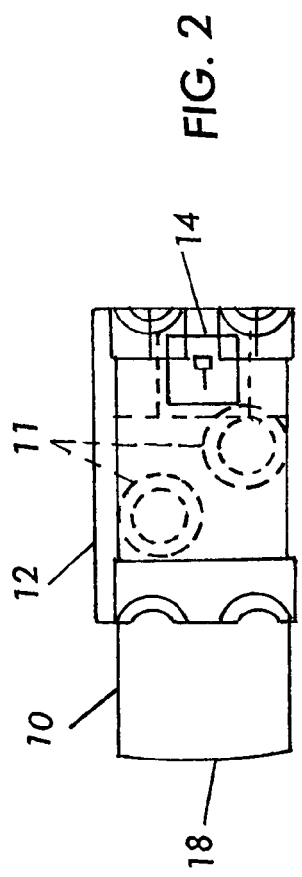
FIG. 2 is a top view of the device of FIG. 1.
Figure 1:
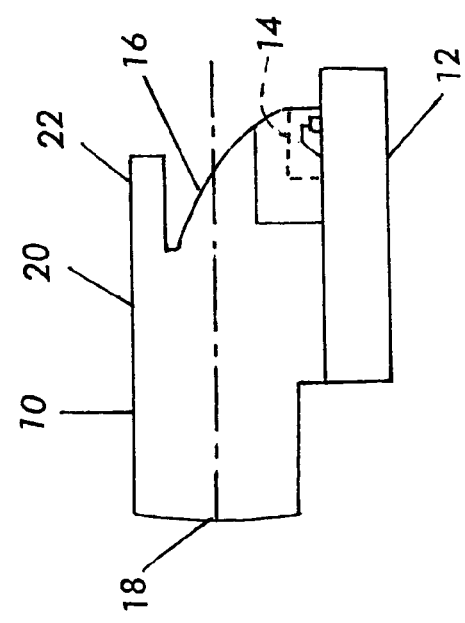
FIG. 1 is a side view of the SMT LED package according to the present invention.

Referring now to FIG. 1, a waveguide 10 is shown mounted on a substrate 12. Substrate 12 also mounts SMT LED 14 and serves as a printed circuit board with traces and contacts to perform circuit connections. For example, metallized solder reflow pads 11 are provided on a portion of substrate 12 to permit the SMT LED device to be surface mounted to another printed circuit board. Solder reflow pads 11 are positioned and dimensioned to be used with standard traces and pads on a PCB to which the LED module is mounted. In addition, substrate 12 includes traces and circuit connections for powering and controlling LED 14. Substrate 12 also includes mechanical or optical indicia for positioning waveguide 10 for mounting on substrate 12. Substrate 12 also includes positioning information for locating LED die 14 to permit connection to the traces and pads provided on substrate 12. For example, appropriate contacts on LED 14 can be wire bonded to traces on substrate 12 to provide a circuit connection for LED 14.

Waveguide 10 is designed to provide good optical conduction and directional characteristics, while being resistant to temperatures involved in a solder reflow process. Waveguide 10 is preferably composed of one piece and formed by injection molding. Waveguide 10 is also preferably formed of a transparent high temperature thermoplastic that has good optical characteristics. Waveguide 10 is shaped according to a particular form to have a number of total internal reflective (TIR) contours 16. Contours 16 are designed into the injection molded waveguide to redirect the spatial emission of light output from LED 14 in a cohesive direction. Although waveguide 10 may be formed of a transparent thermoplastic, light emitted from LED 14 is reflected at the boundary of contours 16 to be redirected along waveguide 10. The shape of TIR contours 16 is such that light incident to the boundary of TIR contour 16 reflects rather than refracts, and is directed along an axis of waveguide 10. Accordingly, light emitted from LED 14 is directed along waveguide 10 to a viewing surface 18. Viewing surface 18 can be lensed to further consolidate or redirect light output for a particular purpose or application.

The material used to form waveguide 10 is able to retain its specific shape when exposed to temperatures found in a solder reflow process. Accordingly, contours 16, surface 18 and marking indicia provided for positioning waveguide 10 relative to substrate 12 should all be immune to deformation in the presence of temperatures provided in a solder reflow process. That is, the shape of waveguide 10 with the above-mentioned features is precisely formed, so that any deviation from thermal stress would otherwise cause degradation and problems for placement and operation of waveguide 10 when not composed of a suitable thermoplastic material. As an example of a suitable thermoplastic material, the product known as PTX from Mitsui provides the desired characteristics for constructing waveguide 10.

In addition to the above noted features of waveguide 10 including contours 16, viewing surface 18 and marking indicia for a placement of waveguide 10 on substrate 12, further indicia is provided on a portion 20 of waveguide 10 for use as an optical guide that cooperates with pick and place equipment for automatically inserting components on PCBs. Portion 20 includes a flat landing 22 that serves as an optical guide for pick and place auto insertion equipment.

As discussed above, waveguide 10 and substrate 12 include details and indicia to permit optical alignment between surfaces of waveguide 10 and substrate 12, as well as permitting waveguide 10 to be affixed to substrate 12. For example, waveguide 10 can be affixed to substrate 12 according to various techniques including adhesion, snap fits or press fits. In addition, viewing surface 18 is projected forward of a location of solder pads 11. By locating viewing surface 18 away from solder pads 11, incidences of contamination to viewing surface 18 are reduced. Moreover, viewing surface 18 is less likely to be damaged during automated circuit construction and PCB insertion.

Because waveguide 10 is resistant to deformation in temperatures provided in a solder reflow environment, it can be pre-assembled to substrate 12 for use in pick and place operations prior to a solder reflow process. Accordingly, unlike prior art devices, waveguide 10 also serves as a pick and place guide with mechanical features that aid in automatic assembly. Using a waveguide for pick and place operations is heretofore unknown because the waveguide would not survive the solder reflow process. Accordingly, the present invention permits fully automatic SMT PCB manufacture with LED components, which could not previously be achieved.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An SMT LED device, comprising:
a substrate having circuit traces to provide connections for the LED, and for mounting the LED;
solder pads on a first side of the substrate and coupled to the circuit traces for providing external connections with the LED;
an LED die mounted on a second surface of the substrate and coupled to the circuit traces;
an optical waveguide mounted on the second surface of the substrate and coupled to the LED die to direct light from the LED die in a specified direction;
positioning indicia on at least one of the waveguide and the substrate; and
the waveguide being composed of a material resistant to deformation in the presence of temperatures found in a solder reflow process.

2. The LED according to claim 1, further comprising a light projection surface on a portion of the waveguide to which light is directed.

3. An SMT LED device, comprising:
a substrate having circuit traces to provide connections for the LED, and for mounting the LED;
solder pads on a first side of the substrate and coupled to the circuit traces for providing external connections with the LED;
an LED die mounted on a second surface of the substrate and coupled to the circuit traces;
an optical wave guide mounted on the second surface of the substrate and coupled to the LED die to direct light from the LED die in a specified direction;
positioning indicia on at least one of the waveguide and the substrate;
the waveguide being composed of a material resistant to deformation in the presence of temperatures found in a solder reflow process; and
a guide structure on a portion of the waveguide for locating the LED on a printed circuit board with automated machinery.

4. The LED according to claim 1, further comprising a total internal reflective contour on a portion of the waveguide for directing the light from the LED die in the specified direction.

5. The LED according to claim 1, wherein the waveguide material is transparent.

6. The LED according to claim 1, wherein the waveguide material is a high temperature thermoplastic.

* * * * *